United States Patent
Saeki et al.

(10) Patent No.: US 11,929,695 B2
(45) Date of Patent: Mar. 12, 2024

(54) CONTROL DEVICE, MAGNETIC FLUX ESTIMATION DEVICE, AND MAGNETIC FLUX ESTIMATION METHOD

(71) Applicant: KABUSHIKI KAISHA YASKAWA DENKI, Fukuoka (JP)

(72) Inventors: Takahiro Saeki, Fukuoka (JP); Shingo Fukumaru, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 49 days.

(21) Appl. No.: 17/648,062

(22) Filed: Jan. 14, 2022

(65) Prior Publication Data

US 2022/0224268 A1    Jul. 14, 2022

(30) Foreign Application Priority Data

Jan. 14, 2021    (JP) ................................. 2021-004405

(51) Int. Cl.
*H02P 23/14*    (2006.01)

(52) U.S. Cl.
CPC .................................... *H02P 23/14* (2013.01)

(58) Field of Classification Search
CPC ..... H02P 23/14; H02P 21/141; H02P 23/0004
See application file for complete search history.

(56) References Cited

U.S. PATENT DOCUMENTS

| | | | |
|---|---|---|---|
| 11,088,643 B1* | 8/2021 | Han | ......................... H02P 21/24 |
| 2007/0001635 A1 | 1/2007 | Ho | |
| 2015/0372627 A1* | 12/2015 | Kim | ......................... H02P 21/16 318/801 |
| 2016/0036364 A1* | 2/2016 | Yamazaki | ............... H02P 21/12 318/400.02 |
| 2020/0106377 A1* | 4/2020 | Xu | ......................... H02P 21/18 |

FOREIGN PATENT DOCUMENTS

| | | |
|---|---|---|
| CN | 102420561 A | 4/2012 |
| JP | 2007-525137 A | 8/2007 |

OTHER PUBLICATIONS

Extended European Search Report dated Jun. 9, 2022, for EP Application No. 22151663.6.

* cited by examiner

*Primary Examiner* — Zoheb S Imtiaz
(74) *Attorney, Agent, or Firm* — Colson Law Group

(57) ABSTRACT

A control device which includes a power conversion circuit configured to supply driving power to an electric motor, a magnetic flux estimation circuit configured to estimate a primary magnetic flux of the motor, and a voltage command generation circuit (control circuit) configured to control the conversion circuit based on an estimation result of the primary magnetic flux, in which the estimation circuit performs, when an operating speed of the motor is less than a predetermined level, a first estimation of estimating the primary magnetic flux based on an output current to the motor and an inductance thereof, and performs, when the speed exceeds a predetermined level, a second estimation of estimating the primary magnetic flux by estimating a magnetic flux differential value based on an output voltage of the conversion circuit and integrating the value using, as an initial value, an estimation result by the first estimation.

20 Claims, 7 Drawing Sheets

CONTROL DEVICE, MAGNETIC FLUX ESTIMATION DEVICE, AND MAGNETIC FLUX ESTIMATION METHOD

CROSS REFERENCE TO RELATED APPLICATIONS

This application claims priority pursuant to 35 U.S.C. 119(a) to Japan Patent Application No. 2021-004405, filed Jan. 14, 2021, which application is incorporated herein by reference in its entirety.

TECHNICAL FIELD

The present disclosure relates to a control device, a magnetic flux estimation device, and a magnetic flux estimation method.

BACKGROUND

JP 2007-525137 T discloses a control device configured to smoothly change a stator magnetic flux calculation model from a current model to a voltage model on the basis of a rotor speed.

SUMMARY

The present disclosure provides a power conversion device effective in improving a reliability of electric motor control based on an estimation result of a primary magnetic flux.

A control device according to an aspect of the present disclosure includes a power conversion circuit configured to supply driving power to an electric motor, a magnetic flux estimation circuit configured to estimate a primary magnetic flux appearing in the electric motor by the supply of the driving power, and a control circuit configured to control the power conversion circuit on the basis of an estimation result of the primary magnetic flux by the magnetic flux estimation circuit. The magnetic flux estimation circuit performs, when an operating speed of the electric motor is less than a predetermined level, a first estimation of estimating the primary magnetic flux on the basis of an output current from the power conversion circuit to the electric motor and an inductance of the electric motor, and performs, when the operating speed exceeds a predetermined level, a second estimation of estimating the primary magnetic flux by estimating a magnetic flux differential value on the basis of an output voltage from the power conversion circuit to the electric motor and integrating the magnetic flux differential value using, as an initial value, an estimation result of the primary magnetic flux by the first estimation.

A magnetic flux estimation device according to another aspect of the present disclosure is configured to perform, when an operating speed of an electric motor is less than a predetermined level, a first estimation of estimating a primary magnetic flux appearing in the electric motor on the basis of an output current from a power conversion circuit to the electric motor and an inductance of the electric motor, and perform, when the operating speed exceeds a predetermined level, a second estimation of estimating the primary magnetic flux by estimating a magnetic flux differential value on the basis of an output voltage from the power conversion circuit to the electric motor and integrating the magnetic flux differential value using, as an initial value, an estimation result of the primary magnetic flux by the first estimation.

A magnetic flux estimation method according to yet another aspect of the present disclosure includes performing, when an operating speed of an electric motor is less than a predetermined level, a first estimation of estimating a primary magnetic flux appearing in the electric motor on the basis of an output current from a power conversion circuit to the electric motor and an inductance of the electric motor, and performing, when the operating speed exceeds a predetermined level, a second estimation of estimating the primary magnetic flux by estimating a magnetic flux differential value on the basis of an output voltage from the power conversion circuit to the electric motor and integrating the magnetic flux differential value using, as an initial value, an estimation result of the primary magnetic flux by the first estimation.

According to the present disclosure, it is possible to provide a power conversion device effective in improving a reliability of electric motor control based on an estimation result of a primary magnetic flux.

DESCRIPTION OF EMBODIMENTS

An embodiment will be described in detail below with reference to the drawings. In the description, elements which are the same or have the same function are given the same reference numbers, and redundant descriptions thereof are omitted.

Control Device

Figure 1:
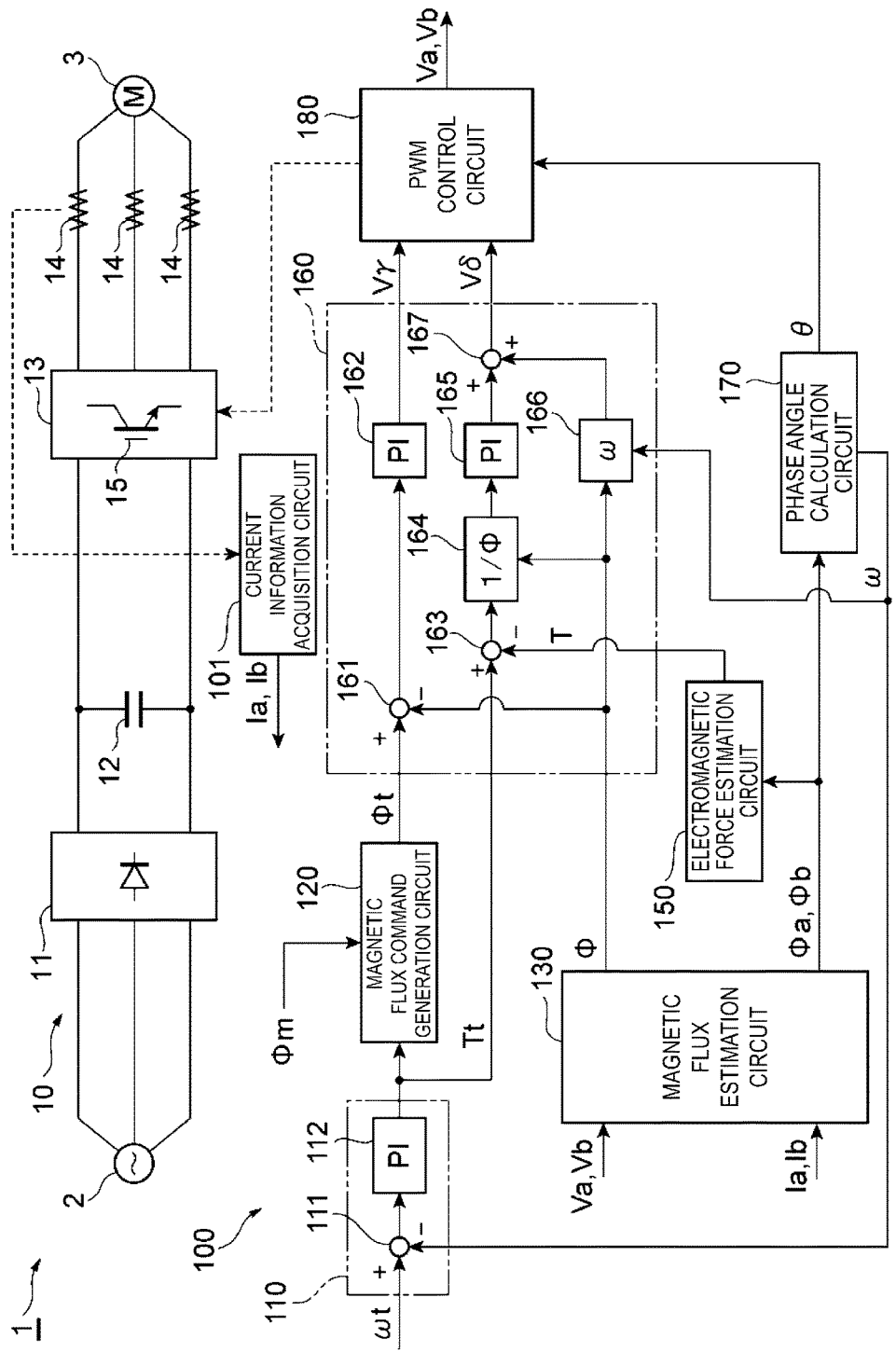
FIG. 1 is a schematic view illustrating an example of a configuration of a control device.

A control device 1 illustrated in FIG. 1 is a device configured to control an electric motor 3. The control device 1 converts power supplied from a power source 2 into driving power and supplies the driving power to the electric motor 3. The power source 2 may be a direct current power source or an alternating current power source. As an example, FIG. 1 illustrates a case in which the power source 2 is a three-phase alternating current power source. Specific examples of the three-phase alternating current power source include a power system of an electric power company, a three-phase alternating current generator, and an uninterruptible power source.

The electric motor 3 is an alternating current electric motor that operates by the supply of alternating current driving power (for example, three-phase alternating current power). The electric motor 3 may be a synchronous electric motor. For example, the electric motor 3 is a permanent magnet assistance (PMA) motor. The electric motor 3 may be an interior permanent magnet (IPM) motor, or may be a surface permanent magnet (SPM) motor. The electric motor 3 may be a synchronous reluctance motor with no permanent magnets. The electric motor 3 may be an induction electric motor.

The electric motor 3 may be a fixed coil type provided with a coil in the stator, or may be a movable coil type provided with a coil in a movable element. Further, the electric motor 3 may be a rotating type or may be a linear type.

The control device 1 includes a power conversion circuit 10 and a control circuit 100. The power conversion circuit 10 converts power supplied from the power source 2 (hereinafter referred to as "source power") to driving power and supplies the driving power to the electric motor 3. As an example, the power conversion circuit 10 includes a rectifier circuit 11, a smoothing capacitor 12, an inverter circuit 13, and a current sensor 14. The rectifier circuit 11 is, for example, a diode bridge circuit or a pulse width modulation (PWM) converter circuit, and converts the source power described above to direct current power. The smoothing capacitor 12 smooths the direct current power described above.

The inverter circuit 13 performs power conversion between the direct current power described above and the driving power described above. For example, the inverter circuit 13 converts the direct current power to the driving power and supplies the driving power to the electric motor 3 in a powering state, and converts the power generated by the electric motor 3 into direct current power in a regeneration state. Note that the powering state is a state in which the electric motor 3 operates by the driving power supplied from the inverter circuit 13, and the regeneration state is a state in which the electric motor 3 supplies power generated in accordance with operation to the inverter circuit 13.

For example, the inverter circuit 13 includes a plurality of switching elements 15, and performs the power conversion described above by switching the plurality of switching elements 15 on and off. Each of the switching elements 15 is, for example, a power metal-oxide-semiconductor field-effect transistor (MOSFET) or an insulated gate bipolar transistor (IGBT), and is switched on and off in accordance with a gate drive signal.

The current sensor 14 detects a current flowing between the inverter circuit 13 and the electric motor 3 (hereinafter referred to as "output current"). For example, the current sensor 14 may be configured to detect the currents of all phases of the three-phase alternating current (U phase, V phase, and W phase), or may be configured to detect the currents of any two phases of the three-phase alternating current. A sum of the currents of the U phase, V phase, and W phase is zero except in a case in which a zero phase current occurs, and thus the information of the currents of all phases can be acquired even in a case in which the currents of two phases are detected.

The configuration of the power conversion circuit 10 illustrated above is merely an example. The configuration of the power conversion circuit 10 can be modified as long as the driving power of the electric motor 3 can be generated. For example, the rectifier circuit 11 may be a PWM converter that converts alternating current power to direct current power or a matrix converter circuit. The power conversion circuit 10 may be a matrix converter circuit that performs bidirectional power conversion between the source power and the driving power without direct current conversion. In a case in which the source power is direct current power, the power conversion circuit 10 need not include the rectifier circuit 11.

The control circuit 100 controls the power conversion circuit 10 such that the driving power according to a control command is supplied to the electric motor 3. The control circuit 100 controls the power conversion circuit 10 on the basis of an estimation result of a primary magnetic flux. More specifically, the control circuit 100 is configured to estimate a primary magnetic flux appearing in the electric motor 3 by the supply of the driving power, estimate an electromagnetic force of the electric motor 3 on the basis of the estimation result of the primary magnetic flux and the output current (current detected by the current sensor 14), and control the power conversion circuit 10 on the basis of a deviation between a target magnetic flux and the estimation result of the primary magnetic flux and a deviation between a target electromagnetic force and an estimation result of the electromagnetic force. Therefore, the control circuit 100 includes a magnetic flux estimation device that estimates the primary magnetic flux described above.

For example, the control circuit 100 includes, as functional elements, an electromagnetic force command generation circuit 110, a magnetic flux command generation circuit 120, a current information acquisition circuit 101, a magnetic flux estimation circuit 130, an electromagnetic force estimation circuit 150, a voltage command generation circuit 160, a phase angle calculation circuit 170, and a PWM control circuit 180.

The electromagnetic force command generation circuit 110 generates the target electromagnetic force described above so as to cause the electric motor 3 to perform a desired operation. The "electromagnetic force" need only be a value correlating to force applied by the electric motor 3 to the driven object. In a case in which the electric motor 3 is a rotating type, the electromagnetic force may be a torque appearing in the electric motor 3 around an axis of rotation. In a case in which the electric motor 3 is a linear type, the electromagnetic force may be thrust force produced in a movement direction of the movable element by the electric motor 3.

As an example, the electromagnetic force command generation circuit 110 calculates a speed deviation, which is a difference between a target speed $\omega t$ and a speed estimated value $\omega$, as represented by summing point 111. The target speed $\omega t$ is, for example, a target value of an angular speed of an electrical angle, and the speed estimated value $\omega$ is an estimated value of the angular speed of the electrical angle. The electromagnetic force command generation circuit 110 may acquire the target speed $\omega t$ stored in advance by the control circuit 100, or may acquire the target speed $\omega t$ from an upper controller such as a programmable logic controller. The electromagnetic force command generation circuit 110 calculates a target torque Tt (target electromagnetic force) by applying a proportional operation, proportional/integration operation, a proportional/integration/differentiation operation, or the like to the speed deviation, as represented by block 112.

The magnetic flux command generation circuit 120 calculates a target primary magnetic flux $\Phi t$ described above on the basis of the target torque Tt, the magnetic flux of the magnets of the electric motor 3, and the inductance of the electric motor 3. For example, when the electric motor 3 is a synchronous electric motor other than a synchronous reluctance electric motor, the magnetic flux command generation circuit 120 calculates a target current on the basis of the target torque Tt, and calculates the target primary magnetic flux $\Phi t$ according to the following equation:

$$\Phi dt = Ld \cdot Idt + \Phi m \quad (1)$$

$$\Phi qt = Lq \cdot Iqt$$

$$\Phi t = (\Phi dt^2 + \Phi qt^2)^{1/2}$$

Φdt: d-axis primary magnetic flux target value
Φqt: q-axis primary magnetic flux target value
Ld: d-axis inductance
Lq: q-axis inductance
Idt: d-axis current target value
Iqt: q-axis current target value
Φm: Magnetic flux of magnets In a case in which the electric motor 3 is a synchronous reluctance electric motor, the magnetic flux Φm of the magnets in equation (1) is zero. In a case in which the electric motor 3 is an induction electric motor, the d-axis inductance Ld is replaced by the primary inductance L1. The q-axis inductance Lq is replaced by a leakage inductance corresponding to a sum of a primary leakage inductance l1 and a secondary leakage inductance l2.

The d axis and the q axis are coordinate axes of a dq coordinate system, which is a rotating coordinate system, and are respectively perpendicular to the axis of rotation of the electric motor 3. In a case in which the electric motor 3 is a PMA, the d axis, for example, is in a direction of the magnetic flux of the magnets, and the q axis is perpendicular to the direction of the magnetic flux of the magnets. An origin at which the d axis and the q axis meet is positioned at a center of rotation of the electric motor 3. In a case in which the electric motor 3 is an induction electric motor, the d axis is, for example, oriented toward a direction of a gap magnetic flux, and the q axis is perpendicular to the direction of the gap magnetic flux. In a case in which the electric motor 3 is a synchronous reluctance electric motor, the d axis is in a salient pole direction of the rotor, and the q axis is perpendicular to the salient pole direction. Further, in a case in which the electric motor 3 is a synchronous reluctance electric motor, the d axis and the q axis are coordinate axes of the dq coordinate system that rotates with the salient poles of the rotor, and the d axis is in the salient pole direction.

The d-axis magnetic flux is a d-axis component of the primary magnetic flux, and the q-axis magnetic flux is a q-axis component of the primary magnetic flux. The d-axis current is a current that generates magnetic flux along the d axis and the q-axis current is a current that generates magnetic flux along the q axis. The d-axis inductance is a coefficient for determining the d-axis magnetic flux from the d-axis current, and the q-axis inductance is a coefficient for determining the q-axis magnetic flux from the q-axis current.

The current information acquisition circuit 101 acquires a detection result of the output current by the current sensor 14, and performs three-phase to two-phase conversion on the acquired detection result to calculate an a-axis current Ia and a b-axis current Ib. The a-axis current Ia is an a-axis component of the output current, and the b-axis current Ib is a b-axis component of the output current.

The a axis and the b axis are coordinate axes of an ab coordinate system, which is a fixed coordinate system, and are each perpendicular to the axis of rotation of the electric motor 3. The a axis and the b axis are perpendicular to each other, and an origin at which the a axis and the b axis meet coincides with a center of rotation of the electric motor 3.

The magnetic flux estimation circuit 130 estimates the primary magnetic flux appearing in the electric motor 3 by the supply of driving power. For example, the magnetic flux estimation circuit 130 calculates a primary magnetic flux estimated value Φ, an a-axis primary magnetic flux estimated value Φa, and a b-axis primary magnetic flux estimated value Φb. The a-axis magnetic flux is an a-axis component of the primary magnetic flux, and the b-axis magnetic flux is a b-axis component of the primary magnetic flux. The estimation processing of the primary magnetic flux by the magnetic flux estimation circuit 130 will be described later.

The electromagnetic force estimation circuit 150 estimates the torque (electromagnetic force) of the electric motor 3 on the basis of the estimation result of the primary magnetic flux and the output current. For example, the electromagnetic force estimation circuit 150 calculates a torque estimated value T according to the following equation:

$$T = \Phi a \cdot Ib - \Phi b \cdot Ia \quad (2)$$

The voltage command generation circuit 160 (control circuit) controls the power conversion circuit 10 on the basis of the estimation result of the primary magnetic flux by the magnetic flux estimation circuit 130. For example, the voltage command generation circuit 160 controls the power conversion circuit 10 on the basis of the deviation between the target magnetic flux and the estimation result of the primary magnetic flux and the deviation between the target electromagnetic force and the estimation result of the electromagnetic force.

As an example, the voltage command generation circuit 160 generates a voltage command so as to reduce the deviation between the target magnetic flux Φt and the primary magnetic flux estimated value Φ and reduce the deviation between the target torque Tt and the torque estimated value T. For example, the voltage command generation circuit 160 generates a voltage command in a γδ coordinate system that rotates with the primary magnetic flux. The γ axis and the δ axis, which are coordinate axes of the γδ coordinate system, are each perpendicular to the axis of rotation of the electric motor 3. An origin at which the γ axis and the δ axis meet is positioned at the center of rotation of the electric motor 3. The γ axis is oriented toward the direction of the primary magnetic flux, and the δ axis is perpendicular to the direction of the primary magnetic flux. For example, the voltage command generation circuit 160 calculates a γ-axis voltage command Vγ by calculating a magnetic flux deviation, which is the difference between the target magnetic flux Φt and the primary magnetic flux estimated value Φ, as represented by summing point 161, and applying a proportional operation, a proportional/integration operation, a proportional/integration/differentiation operation, or the like on the magnetic flux deviation, as represented by block 162. The γ-axis voltage command Vγ is a γ-axis component of the voltage command.

Further, the voltage command generation circuit 160 calculates a torque control voltage by calculating a torque deviation, which is a difference between the target torque Tt and the torque estimated value T, as represented by summing point 163, dividing the torque deviation by the primary magnetic flux estimated value Φ, as represented by block 164, and applying a proportional operation, a proportional/ integration operation, or a proportional/integration/differentiation operation on the division result, as represented by block 165.

Furthermore, the voltage command generation circuit 160 calculates an induced voltage by multiplying the primary magnetic flux estimated value Φ by the speed estimated value ω, as represented by block 166. Then, the voltage command generation circuit 160 calculates a δ-axis voltage command Vδ by adding the induced voltage to the torque control voltage, as represented by summing point 167. The δ-axis voltage command Vδ is a δ-axis component of the voltage command.

The phase angle calculation circuit 170 calculates the speed estimated value ω and the phase angle estimated value θ by inputting the a-axis magnetic flux estimated value Φa and the b-axis magnetic flux estimated value Φb into a phase locked loop. The speed estimated value ω is an estimated value of a rotation speed of the primary magnetic flux, and the phase angle estimated value θ is an estimated value of a rotational angle of the primary magnetic flux. The speed estimated value ω calculated by the phase angle calculation circuit 170 is fed back to the electromagnetic force command generation circuit 110, and used to calculate the target torque Tt described above. Further, the speed estimated value ω calculated by the phase angle calculation circuit 170 is also used to calculate the induced voltage described above in the voltage command generation circuit 160.

The PWM control circuit 180 controls the power conversion circuit 10 such that a voltage according to the voltage command generated by the voltage command generation circuit 160 is generated. For example, the PWM control circuit 180 calculates a phase voltage command for the driving power by performing rotation transformation according to the phase angle estimated value θ on the γ-axis voltage command Vγ and the δ-axis voltage command Vδ to calculate an a-axis voltage command Va and a b-axis voltage command Vb, and performing a two-phase to three-phase conversion on the a-axis voltage command Va and the b-axis voltage command Vb. The PWM control circuit 180 switches the plurality of switching elements 15 of the inverter circuit 13 on and off such that the three-phase alternating current voltage according to the phase voltage command is applied to the electric motor 3.

In this way, the power conversion circuit 10 is controlled so as to generate a voltage according to the voltage command generated by the voltage command generation circuit 160, and thus the power conversion circuit 10 is controlled on the basis of the deviation between the target magnetic flux and the estimation result of the primary magnetic flux and the deviation between the target electromagnetic force and the estimation result of the electromagnetic force.

In the following, the estimation processing of the primary magnetic flux by the magnetic flux estimation circuit 130 will be specifically exemplified. The magnetic flux estimation circuit 130 is configured to perform, when an operating speed of the electric motor 3 is less than a predetermined level, a first estimation of estimating the primary magnetic flux on the basis of an output current from the power conversion circuit 10 to the electric motor 3 and an inductance of the electric motor 3, and perform, when the operating speed of the electric motor 3 exceeds a predetermined level, a second estimation of estimating the primary magnetic flux by estimating a magnetic flux differential value on the basis of an output voltage from the power conversion circuit 10 to the electric motor 3 and integrating the magnetic flux differential value using, as an initial value, an estimation result of the primary magnetic flux by the first estimation. Note that the operating speed may be a frequency command (speed command in the case of a synchronous electric motor) or may be a speed estimated value.

In the first estimation, the magnetic flux estimation circuit 130 need only estimate the primary magnetic flux on the basis of at least the output current and the inductance, and may further estimate the primary magnetic flux on the basis of the output voltage as well. For example, the magnetic flux estimation circuit 130, in the first estimation, may calculate the primary magnetic flux by calculating the magnetic flux differential value on the basis of the output voltage, correcting the magnetic flux differential value on the basis of the output current and the inductance, and integrating the magnetic flux differential value after correction.

The magnetic flux estimation circuit 130 may, when the operating speed of the electric motor 3 is less than the predetermined level, repeatedly execute the first estimation and, in each of the first estimations, calculate the magnetic flux differential value on the basis of the output voltage, perform a reference estimation of estimating the primary magnetic flux on the basis of the output current and the inductance, calculate a correction value on the basis of a deviation between an estimation result of the primary magnetic flux by a previous first estimation and an estimation result of the primary magnetic flux by the reference estimation, and correct the magnetic flux differential value on the basis of the correction value.

The magnetic flux estimation circuit 130, in the first estimation, may reduce correction of the magnetic flux differential value based on the output current and the inductance in response to the operating speed approaching a predetermined level. "Reduce correction" means reducing the degree to which the correction value calculated on the basis of the output current and the inductance is reflected in the magnetic flux differential value. As an example, the magnetic flux estimation circuit 130 calculates the correction value on the basis of a value obtained by multiplying the correction value calculated on the basis of the output current and the inductance by a correction gain, and reduces the correction gain in response to the operating speed approaching the predetermined level.

The magnetic flux estimation circuit 130 may use the a-axis voltage command Va and the b-axis voltage command Vb as the output voltage described above. The magnetic flux estimation circuit 130 may use the voltage detected value from the sensor as the output voltage described above. Further, the magnetic flux estimation circuit 130 may use the a-axis current Ia and the b-axis current Ib as the output current described above.

Figure 2:
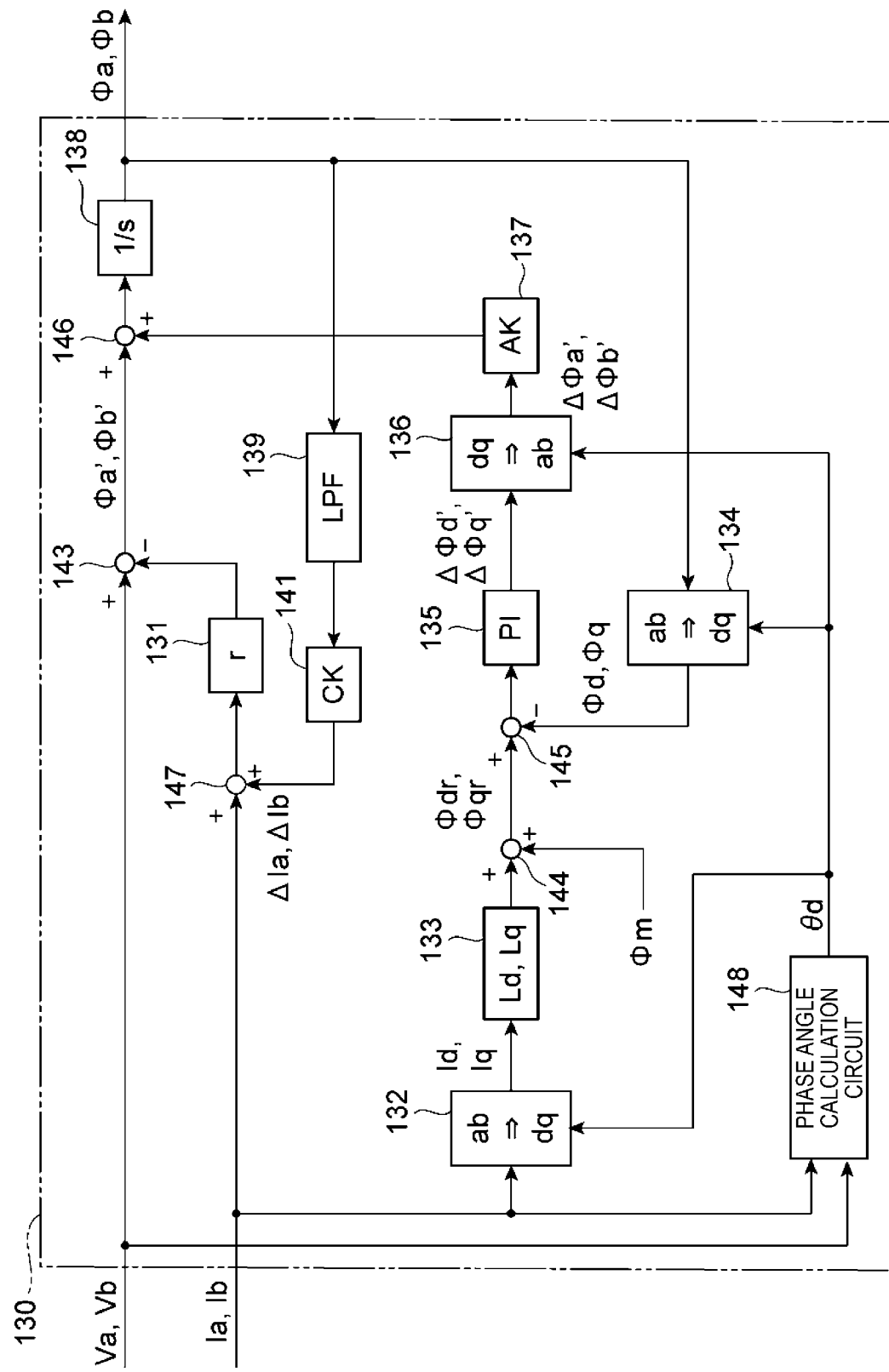
FIG. 2 is a block diagram illustrating an example of a functional configuration of a magnetic flux estimation circuit.

FIG. 2 is a block diagram illustrating an example of a functional configuration of the magnetic flux estimation circuit 130 in a case in which the electric motor 3 is a synchronous electric motor. The magnetic flux estimation circuit 130 calculates the magnetic flux differential value by multiplying the a-axis current Ia and the b-axis current Ib by a winding resistance r to calculate a voltage drop in the winding as represented by block 131, and subtracting the voltage drop from the a-axis voltage command Va and the b-axis voltage command Vb as represented by summing point 143. For example, the magnetic flux estimation circuit 130 calculates the magnetic flux differential value according to the following equation:

$$\Phi a' = Va - r \cdot Ia \quad (3)$$

$$\Phi b' = Vb - r \cdot Ib$$

Φa': a-axis magnetic flux differential value
Φb': b-axis magnetic flux differential value
r: winding resistance The magnetic flux estimation circuit 130 calculates a d-axis current Id and a q-axis current Iq by performing rotation transformation on the a-axis current Ia and the b-axis current Ib, as represented by block 132. The d-axis current Id is a d-axis component of the output current, and the q-axis current Iq is a q-axis component of the output current.

To convert the a-axis current Ia and the b-axis current Ib to the d-axis current Id and the q-axis current Iq, the magnetic flux estimation circuit 130 calculates a phase angle estimated value θd of the dq coordinate system with respect to the ab coordinate system on the basis of the a-axis current Ia, the b-axis current Ib, the a-axis voltage command Va, and the b-axis voltage command Vb, as represented by block 148. For example, the magnetic flux estimation circuit 130 calculates the phase angle estimated value θd by an extended induced voltage observer. More specifically, the magnetic flux estimation circuit 130 calculates, by a phase locked loop, the phase angle estimated value θd so that the d-axis component of the induced voltage in the dq coordinate system is zero. Note that the induced voltage in the dq coordinate system is calculated on the basis of the d-axis current Id and the q-axis current Iq obtained by performing rotation transformation according to the phase angle estimated value θd on the a-axis current Ia and the b-axis current Ib, and a d-axis voltage command Vd and a q-axis voltage command Vq obtained by performing rotation transformation according to the phase angle estimated value θd on the a-axis voltage command Va and the b-axis voltage command Vb.

Furthermore, the magnetic flux estimation circuit 130 performs a reference estimation of the primary magnetic flux on the basis of the d-axis current Id and the q-axis current Iq, the d-axis inductance Ld and the q-axis inductance Lq, and the magnetic flux Φm of the magnets (zero in a case in which the electric motor 3 is a synchronous reluctance electric motor), as represented by block 133 and summing point 144. For example, the magnetic flux estimation circuit 130 calculates a reference estimated value of the primary magnetic flux according to the following equation:

$$\Phi dr = Ld \cdot Id + \Phi m \quad (4)$$

$$\Phi qr = Lq \cdot Iq$$

Φdr: d-axis magnetic flux reference estimated value
Φqr: q-axis magnetic flux reference estimated value The magnetic flux estimation circuit 130 calculates the d-axis magnetic flux estimated value Φd and the q-axis magnetic flux estimated value Φq by performing rotation transformation according to the phase angle estimated value θd on the estimation results of the previous a-axis magnetic flux estimated value Φa and b-axis magnetic flux estimated value Φb, as represented by block 134. The d-axis magnetic flux estimated value Φd is a d-axis component of the primary magnetic flux, and the q-axis magnetic flux estimated value Φq is a q-axis component of the primary magnetic flux. The magnetic flux estimation circuit 130 calculates a magnetic flux error that is a difference between the d-axis magnetic flux reference estimated value Φdr and the d-axis magnetic flux estimated value Φd and a difference between the q-axis magnetic flux reference estimated value Φqr and the q-axis magnetic flux estimated value Φq, as represented by summing point 145.

Furthermore, the magnetic flux estimation circuit 130 calculates correction values ΔΦd', ΔΦq' by applying a proportional operation, a proportional/integration operation, a proportional/integral/differentiation operation, or the like on the magnetic flux error as represented by block 135. Furthermore, the magnetic flux estimation circuit 130 calculates correction values ΔΦa', ΔΦb' by performing rotation transformation according to the phase angle estimated value θ on the correction values ΔΦd', ΔΦq' as represented by block 136. Note that the magnetic flux estimation circuit 130 may use the phase angle estimated value θ in place of the phase angle estimated value θd in the rotation transformation of blocks 134, 136. In this case, two rotation transformations based on the phase angle estimated value θ and the phase angle estimated value θd are required between summing points 144, 145 (not illustrated).

Figure 7:
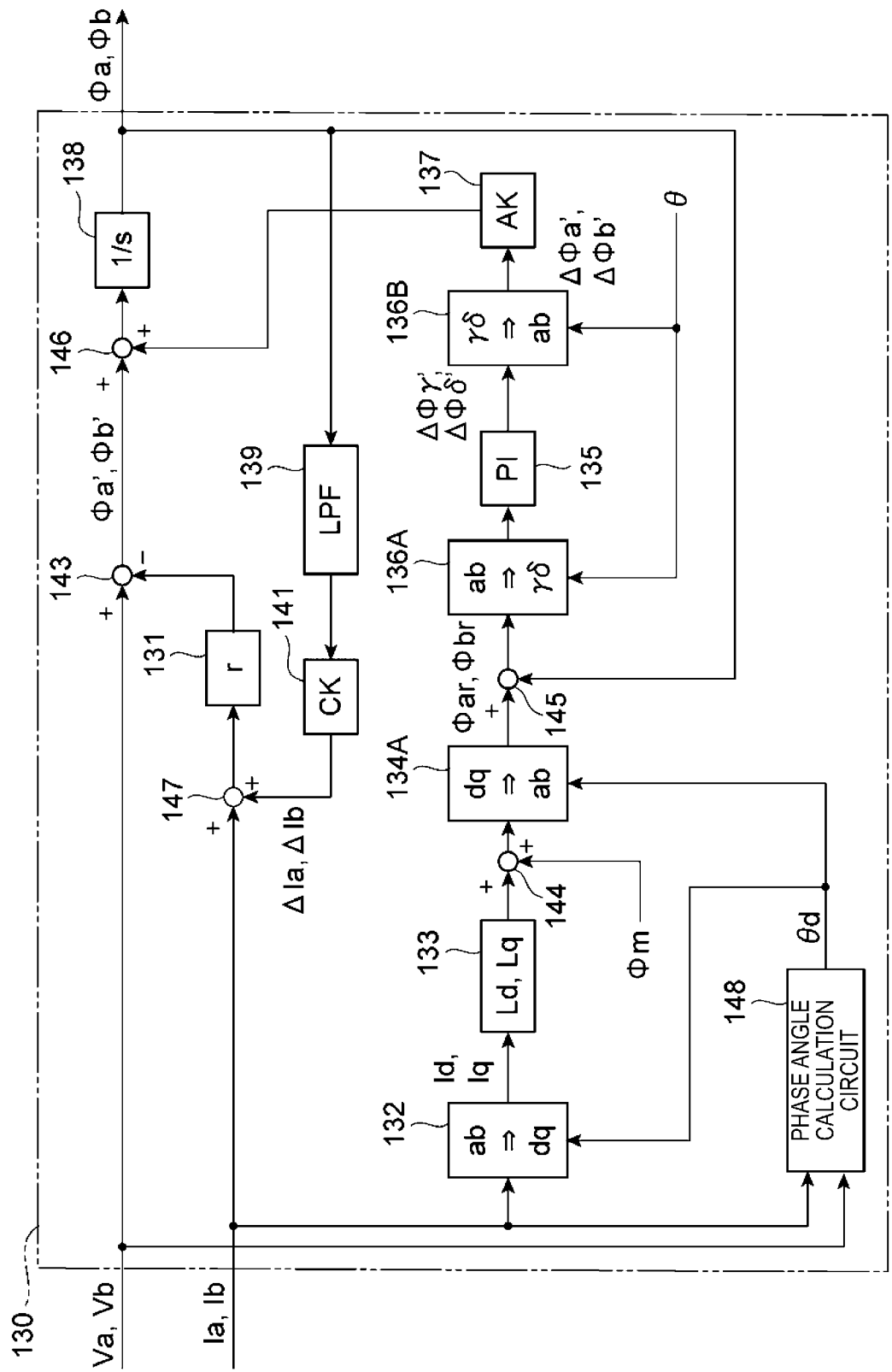
FIG. 7 is a block diagram illustrating a modified example of the magnetic flux estimation circuit.

Further, in block 134, instead of transforming the a-axis magnetic flux estimated value Φa and the b-axis magnetic flux estimated value Φb to the d-axis magnetic flux estimated value Φd and the q-axis magnetic flux estimated value Φq, rotation transformation according to the phase angle estimated value θd may be performed on the d-axis magnetic flux reference estimated value Φdr and the q-axis magnetic flux reference estimated value Φqr to calculate an a-axis magnetic flux reference estimated value Φar and a b-axis magnetic flux reference estimated value Φbr, and the magnetic flux error that is a difference between the a-axis magnetic flux reference estimated value Φar and the a-axis magnetic flux estimated value Φa and a difference between the b-axis magnetic flux reference estimated value Φbr and the b-axis magnetic flux estimated value Φb may be calculated (refer to block 134A in FIG. 7).

In this case, the calculation of the correction values in block 135 may be performed in the γδ coordinate system or in the dq-axis coordinate system. In a case in which calculation is performed in the γδ coordinate system, specifically, the correction values ΔΦa', ΔΦb' may be calculated by performing rotation transformation according to the phase angle estimated value θ on the magnetic flux error to calculate the magnetic flux error in the γδ coordinate system (refer to block 136A in FIG. 7), calculating correction values ΔΦγ', ΔΦδ' in the γδ coordinate system in block 135, and performing rotation transformation according to the phase angle estimated value θ on the correction values ΔΦγ', ΔΦδ' (refer to block 136B in FIG. 7). In a case in which calculation is performed in the dq-axis coordinate system, the coordinate transformations of block 136A and block 136B in FIG. 7 need only be performed using the phase angle estimated value θd (not illustrated).

Furthermore, the magnetic flux estimation circuit 130 multiplies the correction values ΔΦa', ΔΦb' by a correction gain AK and respectively adds the multiplication results to the a-axis magnetic flux differential value Φa' and the b-axis magnetic flux differential value Φb', as represented by block 137 and summing point 146. This corrects the a-axis magnetic flux differential value Φa' and the b-axis magnetic flux differential value Φb' so as to reduce the magnetic flux error described above.

The magnetic flux estimation circuit 130 calculates the a-axis magnetic flux estimated value Φa and the b-axis magnetic flux estimated value Φb by respectively integrating the corrected a-axis magnetic flux differential value Φa' and b-axis magnetic flux differential value Φb', as represented by block 138.

Figure 3A:
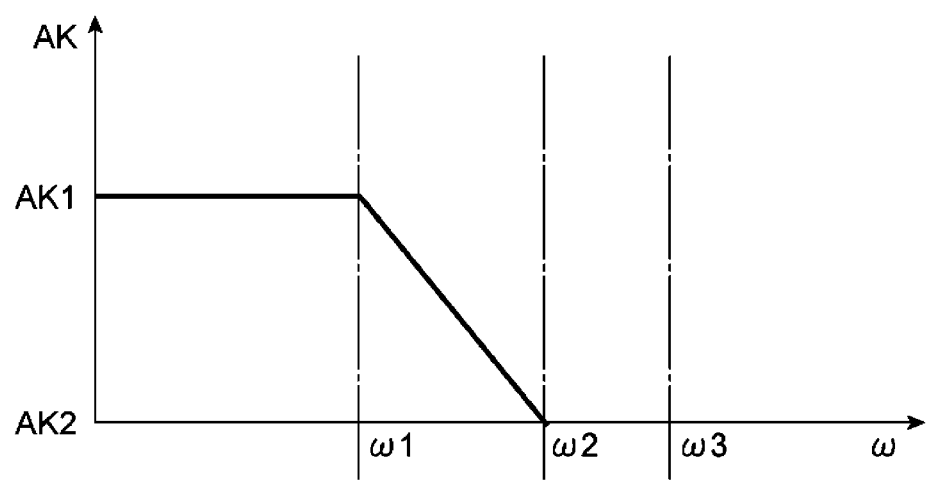
FIGS. 3A and 3B are graphs showing setting examples of a correction gain and a cancellation gain.

The magnetic flux estimation circuit 130 may gradually decrease the correction gain AK as the speed estimated value ω increases. For example, as shown in FIG. 3A, when the speed estimated value ω is less than or equal to a threshold value Φ1, the magnetic flux estimation circuit 130 sets the correction gain AK to a predetermined value AK1, and when the speed estimated value ω is greater than or equal to a threshold value ω2, which is greater than the threshold value Φ1, sets the correction gain AK to a predetermined value AK2 that is less than the predetermined value AK1. Further, as the speed estimated value approaches the threshold value ω2 from the threshold value the magnetic flux estimation circuit 130 gradually changes the correction gain AK from the predetermined value AK1 to the predetermined value AK2.

The estimation of the a-axis magnetic flux estimated value Φa and the b-axis magnetic flux estimated value Φb performed by the magnetic flux estimation circuit 130 when the speed estimated value ω is less than the threshold value ω2 corresponds to the first estimation described above. The estimation of the a-axis magnetic flux estimated value Φa and the b-axis magnetic flux estimated value Φb performed by the magnetic flux estimation circuit 130 when the speed estimated value ω exceeds the threshold value ω2 corresponds to the second estimation described above.

The magnetic flux estimation circuit 130 may stop correction of the magnetic flux differential value based on the output current and the inductance in the second estimation. As an example, the predetermined value AK2 may be zero. In this case, when the speed estimated value ω exceeds the threshold value ω2, correction of the a-axis magnetic flux differential value Φa' and the b-axis magnetic flux differential value Φb' by the correction values ΔΦa', ΔΦb' is stopped. In a state in which correction of the a-axis magnetic flux differential value Φa' and the b-axis magnetic flux differential value Φb' by the correction values ΔΦa', ΔΦb' is stopped, the magnetic flux estimation circuit 130 calculates the a-axis magnetic flux differential value Φa' and the b-axis magnetic flux differential value Φb' without the values being based on the d-axis inductance Ld and the q-axis inductance Lq.

Note that the predetermined value AK2 may be greater than zero. In a case in which the predetermined value AK2 is greater than zero, in the second estimation, the correction of the magnetic flux differential value based on the output current and the inductance is performed at the correction gain AK that is less than the correction gain AK in the first estimation.

Returning to FIG. 2, the magnetic flux estimation circuit 130 may remove, from the estimation result of the primary magnetic flux, a constant component that does not fluctuate in response to the operation of the electric motor 3. The magnetic flux estimation circuit 130, in the removal of the constant component, may perform low-pass filtering on the estimation result of the primary magnetic flux, and remove the estimation result of the primary magnetic flux after the filtering (constant component extracted by the filtering) from the estimation result of the primary magnetic flux before the filtering. For example, as represented by blocks 139, 141, the magnetic flux estimation circuit 130 performs low-pass filtering on the estimation results of the a-axis magnetic flux estimated value Φa and the b-axis magnetic flux estimated value Φb, multiplies the filtering results by a cancellation gain CK, and converts the constant components included in the primary magnetic flux estimation result into current correction values ΔIa, ΔIb.

As represented by summing point 147, the magnetic flux estimation circuit 130 adds the current correction values ΔIa, ΔIb to the a-axis current Ia and the b-axis current Ib immediately prior to input to block 131 (multiplication by the winding resistance r). Thus, at summing point 143, in addition to the voltage drop described above, the values obtained by multiplying the current correction values ΔIa, ΔIb by the winding resistance r (hereinafter referred to as "cancellation values") are subtracted. Therefore, the cancellation values are removed from the a-axis magnetic flux estimated value Φa and the b-axis magnetic flux estimated value Φb calculated next.

The cancellation values correspond to the a-axis magnetic flux estimated value Φa and the b-axis magnetic flux estimated value Φb after filtering, and thus removal of the cancellation values from the a-axis magnetic flux estimated value Φa and b-axis magnetic flux estimated value Φb calculated next corresponds to an example of removal of the a-axis magnetic flux estimated value Φa and the b-axis magnetic flux estimated value Φb after the filtering from the a-axis magnetic flux estimated value Φa and the b-axis magnetic flux estimated value Φb before the filtering. Note that instead of adding the filtering results described above to the a-axis current Ia and the b-axis current Ib, the filtering results may be subtracted from the a-axis magnetic flux differential value Φa' and the b-axis magnetic flux differential value Φb' or may be subtracted from the a-axis voltage command Va and the b-axis voltage command Vb.

The magnetic flux estimation circuit 130 may gradually increase the cancellation gain CK as the speed estimated value ω increases. The magnetic flux estimation circuit 130 may make the cancellation gain CK in the second estimation greater than the cancellation gain CK in the first estimation.

Figure 3B:
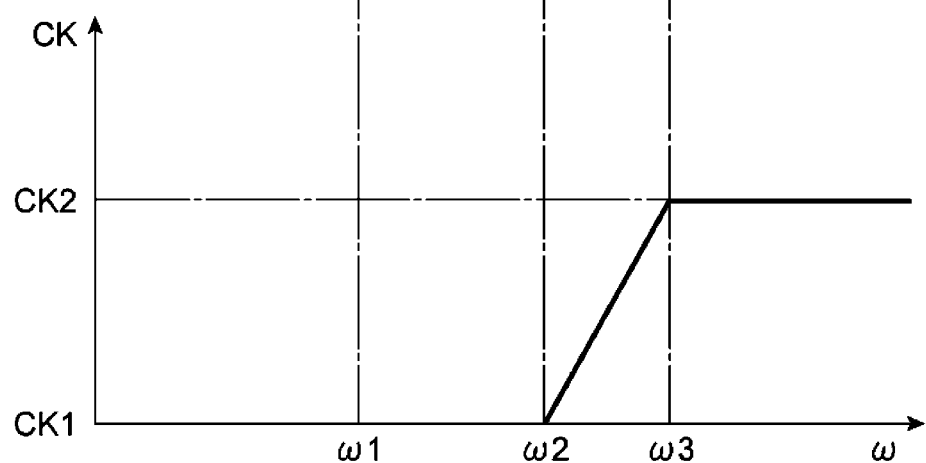

For example, as shown in FIG. 3B, when the speed estimated value ω is less than or equal to the threshold value ω2, the magnetic flux estimation circuit 130 sets the cancellation gain CK to a predetermined value CK1, and when the speed estimated value ω is greater than or equal to a threshold value ω3, which is greater than the threshold value ω2, sets the cancellation gain CK to a predetermined value CK2 that is greater than the predetermined value CK1. Further, as the speed estimated value approaches the threshold value ω3 from the threshold value ω2, the magnetic flux estimation circuit 130 gradually changes the cancellation gain CK from the predetermined value CK1 to the predetermined value CK2.

The magnetic flux estimation circuit 130 may stop removal of the constant component in at least a portion of a period in which the first estimation is performed. As an example, the predetermined value CK1 may be zero. In this case, when the speed estimated value ω is less than the threshold value ω2, removal of the constant components from the a-axis magnetic flux estimated value Φa and the b-axis magnetic flux estimated value Φb is stopped.

Note that the predetermined value CK1 may be greater than zero. In a case in which the predetermined value CK1 is greater than zero, in the first estimation, the constant component is removed at the cancellation gain CK that is less than the cancellation gain CK in the second estimation.

The estimation processing of the primary magnetic flux exemplified above is merely an example. As long as the contribution of the output current and the inductance in the second estimation is small compared to the contribution of the output current and the inductance in the first estimation, and the integration in the second estimation is performed using the estimation result of the primary magnetic flux by the first estimation as the initial value, the estimation processing of the primary magnetic flux can be changed appropriately.

For example, in the first estimation, the primary magnetic flux may be estimated on the basis of the output current and inductance without integration of the magnetic flux differential value. For example, in the first estimation, the magnetic flux estimation circuit 130 may calculate the a-axis magnetic flux estimated value Φa and the b-axis magnetic flux estimated value Φb by performing rotation transformation according to the phase angle estimated value θd on the d-axis magnetic flux reference estimated value Φdr and the q-axis magnetic flux reference estimated value (IV. In this case as well, by starting integration of the magnetic flux differential value in the second estimation using the estimation result of the primary magnetic flux by the first estimation as the initial value, it is possible to increase the estimation accuracy of the primary magnetic flux by the second estimation.

As described above, the electric motor 3 may be an induction electric motor. In a case in which the electric motor 3 is an induction electric motor, the magnetic flux estimation circuit 130, for example, calculates the a-axis magnetic flux reference estimated value Φar and the b-axis magnetic flux reference estimated value Φbr in the ab coordinate system, which is a fixed coordinate system, according to the following equation:

$$\Phi ar = M \cdot (\Phi 2a - M \cdot I1a)/L2 + L1 \cdot I1a \quad (5)$$
$$\Phi br = M \cdot (\Phi 2b - M \cdot I1b)/L2 + L1 \cdot I1b$$

L1: Primary inductance
L2: Secondary inductance
M: Mutual inductance between primary side and secondary side
I1a: a-axis component of primary current
I1b: b-axis component of primary current
Φ2a: a-axis component of secondary magnetic flux
Φ2b: b-axis component of secondary magnetic flux The d-axis magnetic flux reference estimated value Φdr and the q-axis magnetic flux reference estimated value Φqr are calculated by performing rotation transformation according to the phase angle estimated value θd on the a-axis magnetic flux reference estimated value Φar and the b-axis magnetic flux reference estimated value (Mr.

Figure 4:
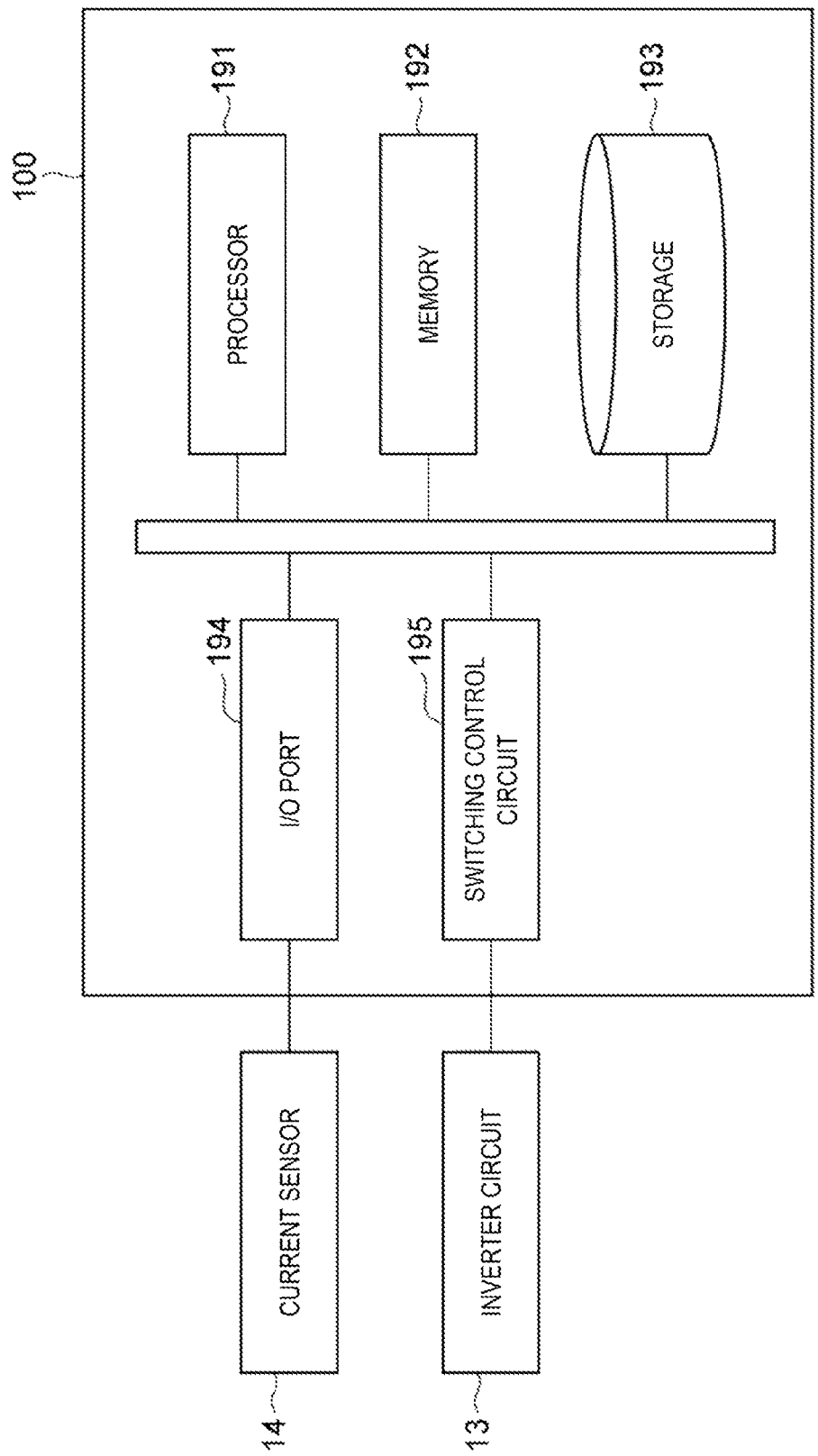
FIG. 4 is a block diagram illustrating an example of a hardware configuration of a control circuit.

FIG. 4 is a block diagram illustrating an example of a hardware configuration of the control circuit 100. As illustrated in FIG. 4, the control circuit 100 includes a processor 191, a memory 192, a storage 193, an I/O port 194, and a switching control circuit 195. The processor 191 may include a plurality of processing devices, the memory 192 may include a plurality of memory devices, and the storage 193 may include a plurality of storage devices.

The storage 193 includes a computer-readable storage medium such as a non-volatile semiconductor memory, for example. The storage 193 stores a program for causing the control circuit 100 to execute estimating a primary magnetic flux appearing in the electric motor 3 by the supply of driving power, estimating an electromagnetic force of the electric motor 3 on the basis of the estimation result of the primary magnetic flux and the output current, and controlling the power conversion circuit 10 on the basis of a deviation between the target magnetic flux and the estimation result of the primary magnetic flux and a deviation between the target electromagnetic force and an estimation result of the electromagnetic force. The program described above is configured to cause the control circuit 100 (magnetic flux estimation device) to execute, when a rotation speed (operating speed) of the electric motor 3 is less than a predetermined level, a first estimation of estimating the primary magnetic flux on the basis of an output current from the power conversion circuit 10 to the electric motor 3 and an inductance of the electric motor 3 and, when the rotation speed of the electric motor 3 exceeds a predetermined level, a second estimation of estimating the primary magnetic flux by estimating a magnetic flux differential value on the basis of an output voltage from the power conversion circuit 10 to the electric motor 3 and integrating the magnetic flux differential value using, as an initial value, an estimation result of the primary magnetic flux by the first estimation. For example, the storage 193 stores a program for implementing each of the functional elements described above in the control circuit 100.

The memory 192 temporarily stores programs loaded from the storage medium of the storage 193 and calculation results from the processor 191. The processor 191 implements each functional element of the control circuit 100 by executing the program described above in cooperation with the memory 192. The I/O port 194 inputs and outputs electric signals to and from the current sensor 14 in accordance with commands from the processor 191. The switching control circuit 195 outputs, to the inverter circuit 13, a drive signal for switching the plurality of switching elements 15 on and off in accordance with commands from the processor 191.

Note that in the control circuit 100, the functions are not limited to being implemented by a program. For example, the control circuit 100 may implement at least one function by a dedicated logic circuit or an application specific integrated circuit (ASIC) integrated therewith.

Control Procedure

Next, as an example of the control method, a control procedure executed by the control circuit 100 will be exemplified. This procedure includes estimating a primary magnetic flux appearing in the electric motor 3 by the supply of driving power, estimating an electromagnetic force of the electric motor 3 on the basis of the estimation result of the primary magnetic flux and the output current, and controlling the power conversion circuit 10 on the basis of a deviation between the target magnetic flux and the estimation result of the primary magnetic flux and a deviation between the target electromagnetic force and an estimation result of the electromagnetic force.

Figure 5:
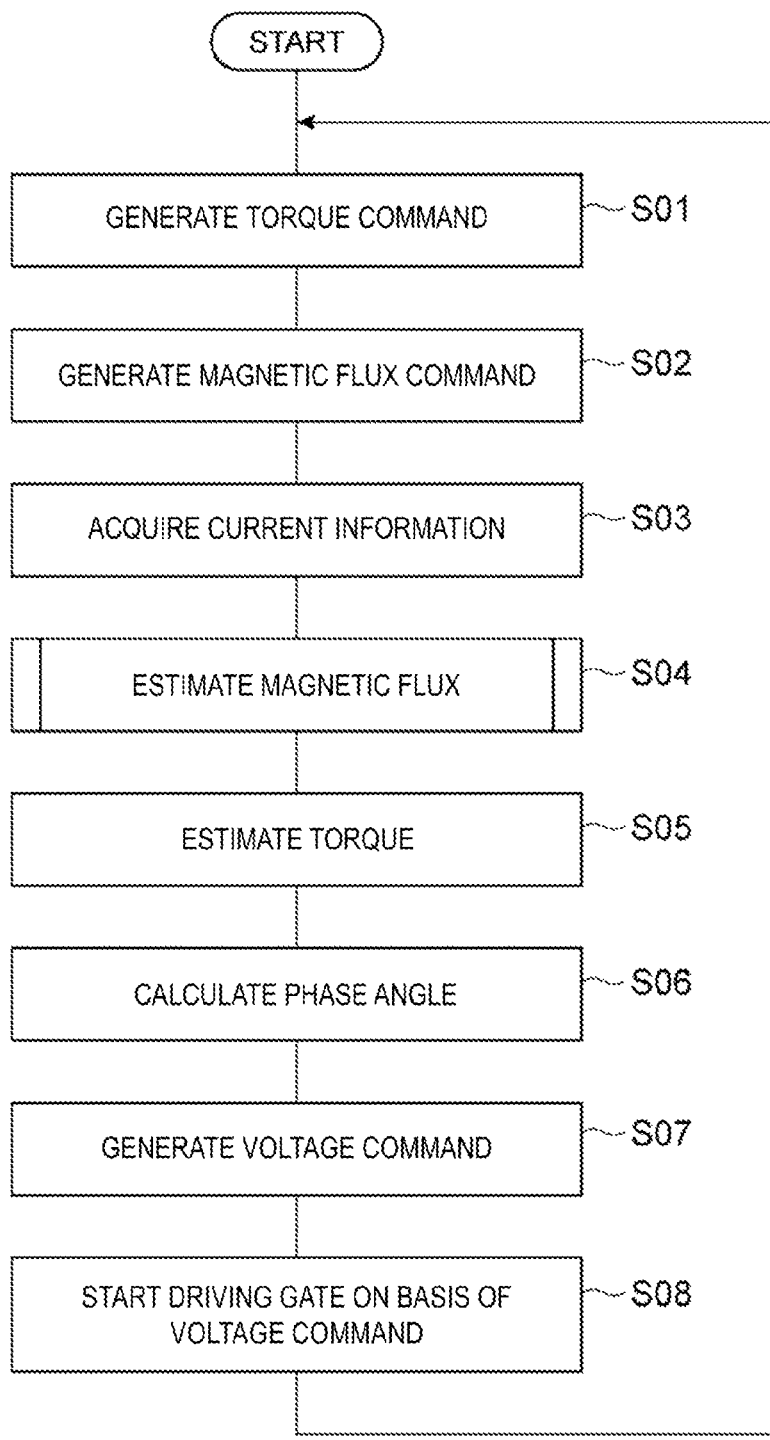
FIG. 5 is a flowchart illustrating an example of a control procedure.

As illustrated in FIG. 5, the control circuit 100 sequentially executes steps S01, S02, S03, S04, S05, S06, S07, S08. In step S01, the electromagnetic force command generation circuit 110 generates the target electromagnetic force described above so as to cause the electric motor 3 to perform a desired operation. For example, the electromagnetic force command generation circuit 110 calculates the target torque Tt by calculating a speed deviation, which is a difference between the target speed ωt and the speed estimated value ω, and applying a proportional operation, a proportional/integration operation, a proportional/integration/differentiation operation, or the like to the speed deviation. In step S02, the magnetic flux command generation circuit 120 calculates the target magnetic flux Φt described above on the basis of the target torque Tt and the inductance of the electric motor 3.

In step S03, the current information acquisition circuit 101 acquires a detection result of the output current by the current sensor 14 and calculates the a-axis current Ia and the b-axis current Ib by performing three-phase to two-phase conversion on the acquired detection result. In step S04, the magnetic flux estimation circuit 130 estimates the primary magnetic flux appearing in the electric motor 3 by the supply of driving power. The specific content of step S04 will be described later. In step S05, the electromagnetic force estimation circuit 150 estimates the torque (electromagnetic force) of the electric motor 3 on the basis of the estimation result of the primary magnetic flux and the output current. In step S06, the phase angle calculation circuit 170 calculates the speed estimated value ω and the phase angle estimated value θ by inputting the a-axis magnetic flux estimated value Φa and the b-axis magnetic flux estimated value Φb into a phase locked loop.

In step S07, the voltage command generation circuit 160 generates a voltage command so as to reduce the deviation between the target magnetic flux Φt and the primary magnetic flux estimated value Φ and reduce the deviation between the target torque Tt and the torque estimated value T. In step S08, the PWM control circuit 180 starts turning the plurality of switching elements 15 of the inverter circuit 13 on and off so as to generate a voltage according to the voltage command generated by the voltage command generation circuit 160. For example, the PWM control circuit 180 calculates the a-axis voltage command Va and the b-axis voltage command Vb by performing rotation transformation according to the phase angle estimated value θ on the d-axis voltage command Vd and the q-axis voltage command Vq, calculates the phase voltage command of the driving power by performing two-phase to three-phase conversion on the a-axis voltage command Va and the b-axis voltage command Vb, and starts turning the plurality of switching elements 15 on and off on the basis of the phase voltage command. The control circuit 100 repeatedly executes the processing described above.

The speed estimated value ω calculated in step S06 is used to calculate the speed deviation in step S01 of the next cycle, and used to generate the voltage command in step S07 of the next cycle. Further, the a-axis voltage command Va and the b-axis voltage command Vb calculated in step S08 are used to estimate the primary magnetic flux in step S04 of the next cycle. Furthermore, the speed estimated value ω and the phase angle estimated value θ calculated in step S06 are also used to estimate the primary magnetic flux in step S04 of the next cycle.

Next, as an example of the magnetic flux estimation method, a procedure for estimating the primary magnetic flux in step S04 will be exemplified. This procedure includes performing, when the operating speed of the electric motor 3 is less than a predetermined level, the first estimation of estimating the primary magnetic flux appearing in the electric motor 3 on the basis of an output current from the power conversion circuit 10 to the electric motor 3 and an inductance of the electric motor 3, and performing, when the operating speed exceeds a predetermined level, the second estimation of estimating the primary magnetic flux by estimating a magnetic flux differential value on the basis of an output voltage from the power conversion circuit 10 to the electric motor 3 and integrating the magnetic flux differential value using, as an initial value, an estimation result of the primary magnetic flux by the first estimation.

Note that, according to the block diagram of FIG. 2, the calculation of the correction values ΔΦa', ΔΦb' is continued even in a period in which the correction gain AK is zero, but the calculation itself of the correction values ΔΦa', ΔΦb' may be stopped in the period in which the correction gain AK is zero. Further, according to the block diagram of FIG. 2, the calculation of the current correction values ΔIa, ΔIb is continued even in a period in which the cancellation gain CK is zero, but the calculation itself of the current correction values ΔIa, ΔIb may be stopped in the period in which the cancellation gain CK is zero. In the following, a procedure of stopping calculation of the correction values ΔΦa', ΔΦb' in a period in which the correction gain AK is zero, and stopping calculation of the current correction values ΔIa, ΔIb in a period in which the cancellation gain CK is zero will be exemplified.

Figure 6:
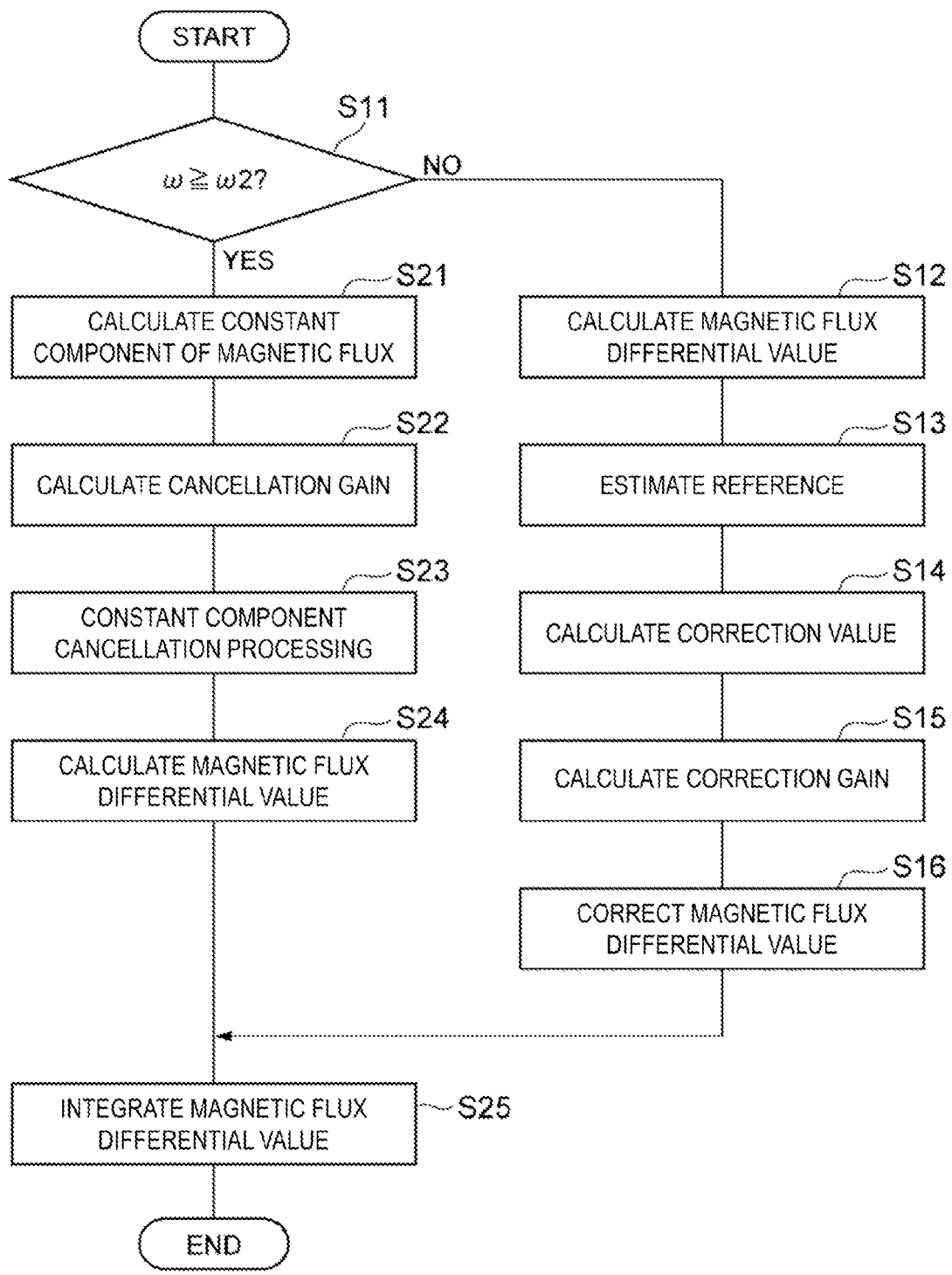
FIG. 6 is a flowchart illustrating an example of a magnetic flux estimation procedure.

As illustrated in FIG. 6, the control circuit 100 first executes step S11. In step S11, the magnetic flux estimation circuit 130 checks whether the operating speed (for example, the speed estimated value ω calculated in the previous step S06) is greater than or equal to the threshold value ω2 described above.

In a case in which it is determined in step S11 that the operating speed is not greater than or equal to the threshold value ω2, the control circuit 100 executes steps S12, S13, S14, S15, S16. In step S12, the magnetic flux estimation circuit 130 calculates the a-axis magnetic flux differential value Φa' and the b-axis magnetic flux differential value Φb' by multiplying the a-axis current Ia and the b-axis current Ib calculated in step S03 by the winding resistance r to calculate a voltage drop in the winding, and subtracting the voltage drop from the a-axis voltage command Va and the b-axis voltage command Vb (a-axis voltage command Va and b-axis voltage command Vb calculated in step S08 of the previous cycle).

In step S13, the magnetic flux estimation circuit 130 performs a reference estimation of the primary magnetic flux on the basis of the a-axis current Ia and the b-axis current Ib, the d-axis inductance Ld and the q-axis inductance Lq, and the magnetic flux Φm of the magnets, and calculates the d-axis magnetic flux reference estimated value Φdr and the q-axis magnetic flux reference estimated value Φqr described above.

In step S14, the magnetic flux estimation circuit 130 calculates the d-axis magnetic flux estimated value Φd and the q-axis magnetic flux estimated value Φq by performing rotation transformation according to the phase angle estimated value θd on the a-axis magnetic flux estimated value Φa and the b-axis magnetic flux estimated value Φb, and calculates the magnetic flux error that is the difference between the d-axis magnetic flux reference estimated value Φdr and the d-axis magnetic flux estimated value Φd, and the difference between the q-axis magnetic flux reference estimated value Φqr and the q-axis magnetic flux estimated value ΦN. Furthermore, the correction values ΔΦd', ΔΦq' are calculated by applying a proportional operation, proportional/integration operation, a proportional/integration/differentiation operation, or the like to the magnetic flux error. In step S15, the magnetic flux estimation circuit 130 calculates the correction gain AK on the basis of the speed estimated value ω. In step S16, the magnetic flux estimation circuit 130 corrects the a-axis magnetic flux differential value Φa' and the b-axis magnetic flux differential value Φb' calculated in step S12 by adding the values obtained by multiplying the correction values ΔΦa', ΔΦb' by the correction gain AK.

In a case in which it is determined in step S11 that the operating speed is greater than or equal to the threshold value ω2, the control circuit 100 executes steps S21, S22, S23, S24, S25. In step S21, the magnetic flux estimation circuit 130 calculates the constant components of the a-axis magnetic flux estimated value Φa and the b-axis magnetic flux estimated value Φb by performing low-pass filtering on the a-axis magnetic flux estimated value Φa and the b-axis magnetic flux estimated value Φb calculated in the previous cycle. In step S22, the magnetic flux estimation circuit 130 calculates the cancellation gain CK on the basis of the operating speed. In step S23, the magnetic flux estimation circuit 130 corrects the a-axis current Ia and the b-axis current Ib calculated in step S03 by multiplying the constant components by the cancellation gain CK to calculate the current correction values ΔIa, ΔIb and adding the current correction values ΔIa, ΔIb to the a-axis current Ia and the b-axis current Ib.

In step S24, the magnetic flux estimation circuit 130 calculates the a-axis magnetic flux differential value Φa' and the b-axis magnetic flux differential value Φb' by multiplying the a-axis current Ia and the b-axis current Ib calculated in step S23 by the winding resistance r to calculate a voltage drop in the winding, and subtracting the voltage drop from the a-axis voltage command Va and the b-axis voltage command Vb (a-axis voltage command Va and b-axis voltage command Vb calculated in step S08 of the previous cycle).

After steps S16, S24, the control circuit 100 executes step S25. In step S25, the magnetic flux estimation circuit 130, as represented by block 138, calculates the a-axis magnetic flux estimated value Φa and the b-axis magnetic flux estimated value Φb by respectively integrating the a-axis magnetic flux differential value Φa' and the b-axis magnetic flux differential value Φb'. Thus, the magnetic flux estimation procedure in step S04 is completed.

Effects of the Present Embodiment

As described above, the control device 1 includes the power conversion circuit 10 configured to supply driving power to the electric motor 3, the magnetic flux estimation circuit 130 configured to estimate a primary magnetic flux appearing in the electric motor 3 by the supply of the driving power, and the voltage command generation circuit 160 (control circuit) configured to control the power conversion circuit 10 on the basis of an estimation result of the primary magnetic flux by the magnetic flux estimation circuit 130. The magnetic flux estimation circuit 130 performs, when the operating speed of the electric motor 3 is less than a predetermined level, a first estimation of estimating the primary magnetic flux on the basis of an output current from the power conversion circuit 10 to the electric motor 3 and an inductance of the electric motor 3, and performs, when the operating speed exceeds a predetermined level, a second estimation of estimating the primary magnetic flux by estimating a magnetic flux differential value on the basis of an output voltage from the power conversion circuit 10 to the electric motor 3 and integrating the magnetic flux differential value using, as an initial value, an estimation result of the primary magnetic flux by the first estimation.

According to the first estimation based on the output current and the inductance, the primary magnetic flux can be estimated with high accuracy. Nevertheless, the estimation result of the first estimation has low robustness against inductance fluctuation due to magnetic flux saturation of the electric motor 3. Further, the estimation result of the first estimation becomes more susceptible to inductance fluctuation as the operating speed of the electric motor 3 increases. On the other hand, according to the second estimation of estimating the primary magnetic flux by estimating the magnetic flux differential value on the basis of the output voltage and integrating the magnetic flux differential value, the dependency on inductance in the estimation of the primary magnetic flux is extremely small, and thus the robustness against inductance fluctuation is high.

Nevertheless, the estimation accuracy of the magnetic flux differential value decreases as the operating speed of the electric motor 3 decreases and the output voltage accuracy of the power conversion circuit 10 decreases. Therefore, for example, the estimation error of the magnetic flux differential value accumulates by integration in a low-speed range after activation of the electric motor 3, and the accumulated estimation error remains even after a high-speed range in which the estimation accuracy of the magnetic flux differential value is sufficiently high is reached. Therefore, even with the second estimation only, it is difficult to estimate the primary magnetic flux with high accuracy.

In this control device 1, when the operating speed of the electric motor 3 is less than the predetermined level, the first estimation suitable for the low-speed range is performed and, when the operating speed of the electric motor 3 exceeds the predetermined level, the second estimation suitable for the high-speed range is performed. Further, in the second estimation, the magnetic flux differential value is integrated using the estimation result of the primary magnetic flux by the first estimation as an initial value, and thus the effect of the estimation error of the magnetic flux differential value in the low-speed range is unlikely to remain in the estimation result of the high-speed range. Accordingly, this is effective in improving the reliability of the control of the power conversion circuit 10 based on the primary magnetic flux.

The magnetic flux estimation circuit 130, in the first estimation, may calculate the primary magnetic flux by calculating the magnetic flux differential value on the basis of the output voltage, correcting the magnetic flux differential value on the basis of the output current and the inductance, and integrating the magnetic flux differential value after correction. In this case, in the first estimation as well, a voltage model method of integrating the magnetic flux differential value based on the output voltage to calculate the primary magnetic flux is used as a base, and the magnetic flux differential value is corrected on the basis of the output current and the inductance, making it possible to smoothly change from the first estimation to the second estimation and change from the second estimation to the first estimation.

The magnetic flux estimation circuit 130, in the first estimation, may reduce correction of the magnetic flux differential value based on the output current and the inductance in response to the operating speed approaching a predetermined level. In this case, the change from the first estimation to the second estimation can be performed more smoothly.

The magnetic flux estimation circuit 130 may repeatedly execute the first estimation and, in each of the first estimations, calculate the magnetic flux differential value on the basis of the output voltage, perform a reference estimation of estimating the primary magnetic flux on the basis of the output current and the inductance, calculate a correction value on the basis of a deviation between an estimation result of the primary magnetic flux by a previous first estimation and an estimation result of the primary magnetic flux by the reference estimation, and correct the magnetic flux differential value on the basis of the correction value. In this case, correction of the magnetic flux differential value based on the output current and the inductance can be easily and accurately performed.

The magnetic flux estimation circuit 130 may stop correction of the magnetic flux differential value based on the output current and the inductance in the second estimation. In this case, the robustness of the estimation result of the primary magnetic flux can be further improved.

The magnetic flux estimation circuit 130 may remove, from the estimation result of the primary magnetic flux, a constant component that does not fluctuate in response to the operation of the electric motor 3. In this case, both the accuracy and the robustness of the estimation result of the primary magnetic flux can be further improved in a compatible manner.

The magnetic flux estimation circuit 130 may stop removal of the constant component in at least a portion of a period in which the first estimation is performed. In this case, an operation load can be suppressed.

The magnetic flux estimation circuit 130, in the removal of the constant component, may perform low-pass filtering on the estimation result of the primary magnetic flux, and remove the estimation result of the primary magnetic flux after the filtering from the estimation result of the primary magnetic flux before the filtering. In this case, removal of the constant component can be easily performed.

The control device 1 may further include the electromagnetic force estimation circuit 150 configured to estimate an electromagnetic force of the electric motor 3 on the basis of the estimation result of the primary magnetic flux and the output current, and the voltage command generation circuit 160 may be configured to control the power conversion circuit 10 on the basis of a deviation between a target magnetic flux and the estimation result of the primary magnetic flux and a deviation between a target electromagnetic force and an estimation result of the electromagnetic force. In this case, the estimation result of the primary magnetic flux can be effectively utilized in electromagnetic force control.

The control device 1 may further include the magnetic flux command generation circuit 120 configured to calculate the target magnetic flux on the basis of the target electromagnetic force and the inductance. In this case, the electromagnetic force can be easily and appropriately controlled.

Embodiments have been described above. However, the present disclosure is not limited to the embodiments described above, and various modifications are possible without departing from the scope of the present disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claim is:

1. A control device comprising:
   a power conversion circuit configured to supply driving power to an electric motor;
   a magnetic flux estimation circuit configured to estimate a primary magnetic flux appearing in the electric motor by the supply of the driving power; and
   a control circuit configured to control the power conversion circuit on the basis of an estimation result of the primary magnetic flux by the magnetic flux estimation circuit,
   wherein the magnetic flux estimation circuit
   determines whether an operating speed of the electric motor is less than a predetermined level or exceeds the predetermined level,
   performs, when the magnetic flux estimation circuit determines that the operating speed of the electric motor is less than the predetermined level, a first estimation of estimating the primary magnetic flux on the basis of an output current from the power conversion circuit to the electric motor and an inductance of the electric motor, and
   performs, when the magnetic flux estimation circuit determines that the operating speed exceeds the predetermined level, a second estimation of estimating the primary magnetic flux by estimating a magnetic flux differential value on the basis of an output voltage from the power conversion circuit to the electric motor and integrating the magnetic flux differential value using, as an initial value, an estimation result of the primary magnetic flux by the first estimation.

2. The control device according to claim 1,
   wherein the magnetic flux estimation circuit, in the first estimation, calculates the primary magnetic flux by calculating the magnetic flux differential value on the basis of the output voltage, correcting the magnetic flux differential value on the basis of the output current and the inductance, and integrating the magnetic flux differential value after correction.

3. The control device according to claim 2,
   wherein the magnetic flux estimation circuit, in the first estimation, reduces correction of the magnetic flux differential value based on the output current and the inductance in response to the operating speed approaching a predetermined level.

4. The control device according to claim 2,
   wherein the magnetic flux estimation circuit repeatedly executes the first estimation and, in each of the first estimations,
   calculates the magnetic flux differential value on the basis of the output voltage, performs a reference estimation of estimating the primary magnetic flux on the basis of the output current and the inductance,
   calculates a correction value on the basis of a deviation between an estimation result of the primary magnetic flux by a previous first estimation and an estimation result of the primary magnetic flux by the reference estimation, and
   corrects the magnetic flux differential value on the basis of the correction value.

5. The control device according to claim 1,
   wherein the magnetic flux estimation circuit, in the second estimation, stops correction of the magnetic flux differential value based on the output current and the inductance.

6. The control device according to claim 1,
   wherein the magnetic flux estimation circuit removes, from the estimation result of the primary magnetic flux, a constant component that does not fluctuate in response to operation of the electric motor.

7. The control device according to claim 6,
   wherein the magnetic flux estimation circuit stops removal of the constant component in at least a portion of a period in which the first estimation is performed.

8. The control device according to claim 7,
   wherein the magnetic flux estimation circuit, in the removal of the constant component, performs low-pass filtering on the estimation result of the primary magnetic flux, and removes the estimation result of the primary magnetic flux after the filtering from the estimation result of the primary magnetic flux before the filtering.

9. The control device according to claim 8, further comprising:
an electromagnetic force estimation circuit configured to estimate an electromagnetic force of the electric motor on the basis of the estimation result of the primary magnetic flux and the output current,
wherein the control circuit controls the power conversion circuit on the basis of a deviation between a target magnetic flux and the estimation result of the primary magnetic flux and a deviation between a target electromagnetic force and an estimation result of the electromagnetic force.

10. The control device according to claim 9, further comprising:
a magnetic flux command generation circuit configured to calculate the target magnetic flux on the basis of the target electromagnetic force and the inductance.

11. A magnetic flux estimation device configured to:
determine whether an operating speed of the electric motor is less than a predetermined level or exceeds the predetermined level,
perform, when the operating speed of the electric motor is less than a predetermined level, a first estimation of estimating a primary magnetic flux appearing in the electric motor on the basis of an output current from a power conversion circuit to the electric motor and an inductance of the electric motor; and
perform, when the operating speed exceeds the predetermined level, a second estimation of estimating the primary magnetic flux by estimating a magnetic flux differential value on the basis of an output voltage from the power conversion circuit to the electric motor and integrating the magnetic flux differential value using, as an initial value, an estimation result of the primary magnetic flux by the first estimation.

12. A magnetic flux estimation method comprising:
determining whether an operating speed of the electric motor is less than a predetermined level or exceeds the predetermined level,
performing, when the operating speed of the electric motor is less than a predetermined level, a first estimation of estimating a primary magnetic flux appearing in the electric motor on the basis of an output current from a power conversion circuit to the electric motor and an inductance of the electric motor; and
performing, when the operating speed exceeds the predetermined level, a second estimation of estimating the primary magnetic flux by estimating a magnetic flux differential value on the basis of an output voltage from the power conversion circuit to the electric motor and integrating the magnetic flux differential value using, as an initial value, an estimation result of the primary magnetic flux by the first estimation.

13. The control device according to claim 3,
wherein the magnetic flux estimation circuit repeatedly executes the first estimation and, in each of the first estimations,
calculates the magnetic flux differential value on the basis of the output voltage,
performs a reference estimation of estimating the primary magnetic flux on the basis of the output current and the inductance,
calculates a correction value on the basis of a deviation between an estimation result of the primary magnetic flux by a previous first estimation and an estimation result of the primary magnetic flux by the reference estimation, and
corrects the magnetic flux differential value on the basis of the correction value.

14. The control device according to claim 2,
wherein the magnetic flux estimation circuit, in the second estimation, stops correction of the magnetic flux differential value based on the output current and the inductance.

15. The control device according to claim 3,
wherein the magnetic flux estimation circuit, in the second estimation, stops correction of the magnetic flux differential value based on the output current and the inductance.

16. The control device according to claim 4,
wherein the magnetic flux estimation circuit, in the second estimation, stops correction of the magnetic flux differential value based on the output current and the inductance.

17. The control device according to claim 13,
wherein the magnetic flux estimation circuit, in the second estimation, stops correction of the magnetic flux differential value based on the output current and the inductance.

18. The control device according to claim 2,
wherein the magnetic flux estimation circuit removes, from the estimation result of the primary magnetic flux, a constant component that does not fluctuate in response to operation of the electric motor.

19. The control device according to claim 3,
wherein the magnetic flux estimation circuit removes, from the estimation result of the primary magnetic flux, a constant component that does not fluctuate in response to operation of the electric motor.

20. The control device according to claim 4,
wherein the magnetic flux estimation circuit removes, from the estimation result of the primary magnetic flux, a constant component that does not fluctuate in response to operation of the electric motor.

* * * * *